United States Patent [19]

Tomoda

[11] 4,339,565
[45] Jul. 13, 1982

[54] ADHESIVE COMPOSITION FOR FLUORINATED RUBBERS

[75] Inventor: Masayasu Tomoda, Otsu, Japan

[73] Assignee: Daikin Kogyo Co., Ltd., Osaka, Japan

[21] Appl. No.: 211,388

[22] Filed: Nov. 28, 1980

[30] Foreign Application Priority Data

Nov. 30, 1979 [JP] Japan ............................... 54-156041

[51] Int. Cl.³ .............................................. C08G 77/04
[52] U.S. Cl. ................................. 528/27; 106/287.11; 106/287.12; 106/287.13; 106/287.14; 106/287.15; 106/287.16
[58] Field of Search ...................... 528/27; 106/287.11, 106/287.12, 287.13, 287.14, 287.15, 287.16

[56] References Cited

U.S. PATENT DOCUMENTS

| | | | |
|---|---|---|---|
| 3,038,875 | 6/1962 | Boyer et al. | 528/27 |
| 3,183,198 | 5/1965 | Wagner | 260/18 PN |
| 3,247,280 | 4/1966 | Kanner | 528/27 |
| 4,250,074 | 2/1981 | Foscante et al. | 528/27 |

Primary Examiner—Melvyn I. Marquis
Attorney, Agent, or Firm—Birch, Stewart, Kolasch and Birch

[57] ABSTRACT

An adhesive composition for fluorinated rubbers which comprises a fluorine-containing epoxy compound and a silane compound having an organic functional group.

3 Claims, No Drawings

ADHESIVE COMPOSITION FOR FLUORINATED RUBBERS

The present invention relates to an adhesive composition for fluorinated rubbers. More particularly, it relates to an adhesive composition for assuring a firm bonding between a fluorinated rubber and the surface of a substrate.

In comparison with ordinary rubbers, fluorinated rubbers such as elastomeric copolymers of vinylidene fluoride with one or more other fluorine-containing ethylenically unsaturated monomers have outstanding properties of heat resistance, oil resistance, solvent resistance, chemical resistance, etc. Because of this, fluorinated rubbers are used as industrial materials in various fields, among which particularly important are their use as sealing materials such as oil seal, valve stem seal and bearing seal. For such use, fluorinated rubbers are required to be firmly adhered onto the surface of a substrate by the aid of an adhesive agent. This adhesive agent is desired to have an excellent heat resistance for maintaining effectively the favorable characteristic properties of fluorinated rubbers as stated above in addition to a good adhesive property with fluorinated rubbers. Examples of such adhesive agent as conventionally employed are epoxy adhesive agents and silane adhesive agents such as "EPOTAC AD-45/PERCURE-HQ-1W" (manufactured by Nippon Pernox Co., Ltd.), "SIXON 300/301" (manufactured by Dayton Chemical Co., Ltd.), "CHEMLOCK 607" (manufactured by Hughson Chemical Corporation), "METALOCK S-2" and "METALOCK S-3" (manufactured by K. K. Toyo Kagaku Kenkyusho), "TYLOCK SB-06" and "TYLOCK SB-07" (manufactured by Tylock Co., Ltd.) and "MONICAS" (manufactured by K. K. Yokohama Kobunshi Kenkyusho). However, these conventional adhesive agents are still not satisfactory in the bonding strength between a fluorinated rubber and the surface of a substrate, and in fact, a considerable production of defective products due to insufficient adhesion cannot be avoided on the industrial manufacture.

As the result of an extensive study, it has now been found that a composition comprising a fluorine-containing epoxy compound and a silane compound having an organic functional group is quite effective in assuring a firm bonding between a fluorinated rubber and the surface of a substrate.

The adhesive composition of the present invention comprises as the essential components a fluorine-containing epoxy compound and a silane compound having an organic functional group.

The fluorine-containing epoxy compound to be used as one of the essential components is preferred to be an epoxy compound having at least one of fluorinated alkyl, fluorinated phenyl, fluorinated alkylene and fluorinated phenylene groups and at least two epoxy groups. These fluorinated alkyl, fluorinated phenyl, fluorinated alkylene and fluorinated phenylene groups have usually not more than 20 carbon atoms and at least one fluorine atom. Typical examples of the preferred fluorine-containing epoxy compound are covered by the general formula:

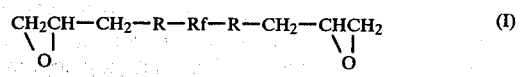

wherein Rf is a fluoroalkylene group having 1 to 18 carbon atoms or a fluorophenylene group, R is a single bond, an alkylene group having 1 or 2 carbon atoms and optionally bearing at least one fluorine atom, an oxyalkylene group having 1 or 2 carbon atoms and optionally bearing at least one fluorine atom or an oxyphenylene group optionally bearing at least one fluorine atom or at least one trifluoromethyl group on the benzene ring and include specifically the following compounds:

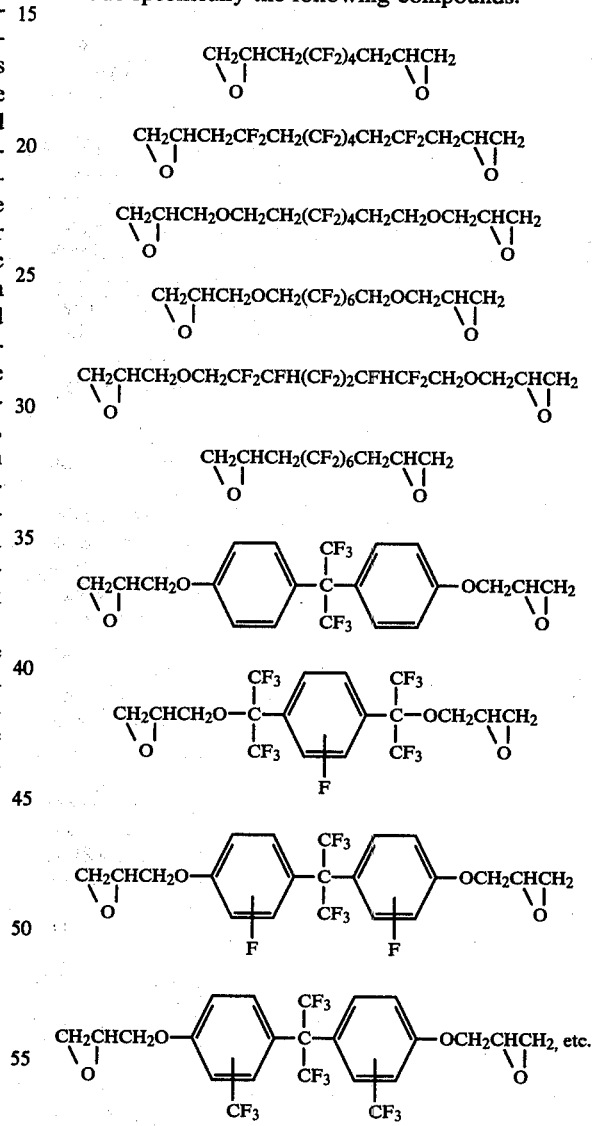

As the silane compound to be used as the other essential component, there may be used silane compounds which are reactive with the fluorine-containing epoxy compound in the presence or absence of any other reactive aid such as a crosslinking agent or a curing agent. Typical examples of such silane compound are covered by the general formula:

wherein $R^1$ is an alkyl or alkenyl group having 1 to 10 carbon atoms, which is optionally substituted with at least one of chlorine, amino, aminoalkyl, ureido, epoxyoxy, glycidoxy, epoxycyclohexyl, acryloyloxy, methacryloyloxy, mercapto and vinyl, $R^2$ and $R^3$ are each chlorine, hydroxyl, $C_1$–$C_{10}$ alkoxy, $C_1$–$C_5$ alkoxy($C_1$–$C_5$)alkoxy, hydroxy($C_2$–$C_4$)alkoxy or $C_1$–$C_5$ acyloxy and y is an integer of 0, 1 or 2. In the formula (II), $R^1$ is preferably a functional group-bearing alkyl group, of which examples are aminoalkyl (e.g. β-aminoethyl, γ-aminopropyl, N-(β-aminoethyl)-γ-aminopropyl), ureidoalkyl (e.g. γ-ureidopropyl), glycidoxyalkyl (e.g. γ-glycidoxypropyl), epoxycyclohexylalkyl (e.g. β-(3,4-epoxycyclohexyl)ethyl), acryloyloxyalkyl (e.g. γ-acryloyloxypropyl), methacryloyloxyalkyl (e.g. γ-methacryloyloxypropyl), mercaptoalkyl (e.g. γ-mercaptopropyl), chloroalkyl (e.g. β-chloroethyl, γ-chloropropyl), vinylalkyl (e.g. γ-vinylpropyl), etc. $R^1$ may be also vinyl.

Specific examples of the silane compound (II) are: γ-aminopropyltriethoxysilane, N-(β-aminoethyl)-γ-aminopropyltrimethoxysilane, γ-ureidopropyltriethoxysilane, γ-glycidoxypropyltriethoxysilane, β-(3,4-epoxycyclohexyl)ethyltrimethylsilane, γ-methacryloyloxypropyltrimethoxysilane, γ-mercaptopropyltrimethoxysilane, γ-chloropropyltrimethoxysilane, vinyltri(β-methoxyethoxy)silane, vinyltriethoxysilane, vinyltrichlorosilane, vinyltriacetoxysilane, β-aminoethyl-β-aminoethyl-γ-aminopropyltrimethoxysilane, N-phenyl-γ-aminopropyltrimethoxysilane, $CH_3COOC_2H_4NHC_2H_4NHC_3H_6Si(OCH_3)_3$, $NH_2C_3H_6Si(OC_2H_5)_3/2CH_2=CH-COOH$ adduct, etc.

The weight proportion of the fluorine-containing epoxy compound and the silane compound in the adhesive composition of the invention is desirably from 95:5 to 30:70, though not limited thereto. When the amount of the fluorine-containing epoxy compound is less than the above lower limit, the bonding strength at the stage of primary vulcanization tends to be lowered.

The adhesive composition of the invention is generally used in the form of a solution or suspension in an organic solvent such as methanol, ethanol, isopropanol, acetone, methylethylketone, benzene or toluene.

Additionally, the adhesive composition may comprise any conventional crosslinking or curing agent for epoxy resins. As such crosslinking or curing agent, there may be used agents which range from an extremely low molecular weight to a high molecular weight and have a substituent such as —$NH_2$, >NH —COOH, —CO—O—CO—, —OH, —SH, —NCO or —CONH—. Of these crosslinking or curing agents, desirable are aliphatic and aromatic diamines, straight chain or branched aliphatic polyamines, alicyclic polyamines, modified amines (e.g. adducts of ethylene oxide with diethylene tetramine, etc.), secondary amines, tertiary amines, boron trifluoride-amine complexes, low polymerization degree compounds (e.g. melamine resin, urea resin, amide resin, urethane resin, phenol resin, sulfide resin), acids (e.g. phthalic acid, maleic acid, trimellitic acid, chlorendic acid) and their anhydrides, imidazole compounds containing an epoxy functional group, etc. Among them, the desirable crosslinking or curing agents are amines and acid anhydrides.

The adhesive composition of the present invention is characteristic in assuring a firm bonding and showing a good adhesive property already at the primary vulcanization stage. Because of these characteristics, the production of defective products is much decreased. Also, the adhesive composition is quite stable at room temperature and has a long pot life. Thus, it can be formulated not only as a two-liquid type adhesive agent but also as a single liquid type adhesive agent. In addition, it is quite advantageous that the adhesive composition has an excellent heat resistance and can be applied to a wide variety of substrates.

Bonding of a fluorinated rubber onto any substrate by the use of the adhesive composition of the invention may be carried out in various procedures. When, for instance, the bonding of a vulcanized fluorinated rubber in a film or sheet form is intended, the surfaces of the rubber and of the substrate to be bonded are degreased and cleaned with any suitable solvent such as acetone, and then the adhesive composition is applied onto at least one of the surfaces as degreased and cleaned by spraying, brushing, flow spreading or the like. After drying and heating, the surfaces are brought into contact under pressure. When the bonding of an unvulcanized fluorinated rubber is intended, a solution of the adhesive composition in any appropriate organic solvent as mentioned above is applied onto the surface of a substrate, which may be previously degreased and/or roughened by washing with an acid or blasting. After drying, an unvulcanized rubber composition comprising a fluorinated rubber, a vulcanizing agent, an acid-acceptor, a filler, etc. is placed on the said surface and then subjected to vulcanization to thereby achieve the desired bonding.

Vulcanization of a fluorinated rubber is generally effected at a temperature of 140° to 200° C. under a pressure of 20 to 100 kg/cm² for 10 to 180 minutes as primary vulcanization and then at a temperature of 150° to 260° C. for 0 to 30 hours as secondary vulcanization.

As stated above, the adhesive composition of the invention is used for bonding of a fluorinated rubber. It is also useful to prepare a crosslinkable or curable fluorinated rubber paint composition by dissolving it together with a fluorinated rubber into a suitable solvent (e.g. ketones), which can dissolve both of them therein.

Practical embodiments of this invention are illustratively shown in the following examples wherein part(s) and % are by weight unless otherwise indicated.

EXAMPLE 1

(1) Preparation of fluorinated rubber

Vinylidene fluoride/hexafluoropropene copolymer (100 parts), bisphenol AF (2 parts), 8-benzyl-1,8-diazabicyclo[5.4.0]-7-undecenium chloride (0.4 part), MT carbon black (20 parts), magnesium oxide (3 parts) and calcium hydroxide (6 parts) were kneaded well by a roll, allowed to stand overnight and kneaded again. Then, the resulting mixture was extruded to make a rubber sheet having a thickness of about 2 mm.

(2) Preparation of adhesive composition

A fluorine-containing epoxy compound of the formula:

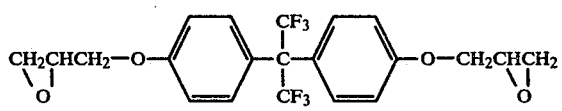

(hereinafter referred to as "AFEO") (6.7 parts), an aminosilane ["A-1120";

H₂NCH₂CH₂NHCH₂CH₂CH₂Si(OCH₃)₃; manufactured by Nihon Unicar Co.] (4.8 parts), acetone (16.5 parts), methanol (24 parts) and ethanol (48 parts) were mixed together to make an adhesive composition.

(3) Application of adhesive composition

A stainless steel plate (25×50×1.5 mm) was washed with cleanser and scrubbing brush, washed with water, treated with acetone and air-dried. The plate was dipped in a degreasing bath of 1,1,2-trichloro-1,2,2-trifluoroethane. It was taken out on each occasion of use and used as a substrate to be bonded.

The adhesive composition prepared in (2) was allowed to stand for one day and then applied onto the substrate treated in (3) according to the flow-spread process, followed by drying in the air.

(4) Vulcanization bonding

A metal mold (173×127×7.9 mm; JIS (Japanese Industrial Standard) K 6301 8.3.1(2)) heated at 170° C. was set with an aluminum plate so as to make it possible the preparation of a vulcanized rubber having a finished thickness of about 2 mm.

About 20 mm wide portions at both ends of the substrate containing the adhesive composition as in (3) were covered by masking tapes, the rubber sheet prepared in (1) was placed thereon and heating was effected in the said metal mold at 170° C. under 35 kg/cm²G for 15 minutes, whereby vulcanization bonding proceeded to give a rubber sheet-bonded substrate.

(5) Test on peeling strength

The rubber sheet-bonded substrate produced in (4) was taken out from the metal mold and pulled at a speed of 50 mm/min in accordance with JIS K 6301. The peeling strength was 4.8 kg/cm.

Separately, the rubber sheet-bonded substrate produced in (4) was subjected to secondary vulcanization at 230° C. for 24 hours. The peeling strength of the resultant product was 3.7 kg/cm.

COMPARATIVE EXAMPLE 1

In the same manner as in Example 1 but using "CHEMLOCK 607" as an adhesive agent, the operations were carried out.

The peeling strength in case of vulcanization bonding at 170° C. for 15 minutes was 1.5 kg/cm. By strongly pulling with the force of the fingers, the bonded parts were peeled off. The peeling strength after secondary vulcanization at 230° C. for 24 hours was 3.3 kg/cm.

COMPARATIVE EXAMPLE 2

In the same manner as in Example 1 but using a 6% dilution of the aminosilane "A-1120" with methanol/ethanol (50:50 by volume) as an adhesive agent, the operations were carried out.

The peeling strength in case of vulcanization bonding at 170° C. for 15 minutes was 0.8 kg/cm. The bonded parts were peeled off with the finger force.

EXAMPLE 2

In the same manner as in Example 1 but using an aluminium plate (25×60×2.5 mm) as a substrate to be bonded and a rubber sheet having a thickness of about 2 mm, the operations were carried out.

The peeling strength in case of vulcanization bonding at 170° C. for 15 minutes was 3.8 kg/cm.

COMPARATIVE EXAMPLE 3

In the same manner as in Example 1 but using "CHEMLOCK 607" as an adhesive agent and the substrate and the rubber sheet as employed in Example 2, the operations were carried out.

The peeling strength in case of vulcanization bonding at 170° C. for 15 minutes was 0.98 kg/cm. The bonded parts were peeled off with the finger force.

EXAMPLE 3

In the same manner as in Example 2 but roughening the surface of the substrate by sandblasting, the operations were carried out.

The peeling strength in case of vulcanization bonding at 170° C. for 15 minutes was 6.2 kg/cm.

EXAMPLE 4

In the same manner as in Example 1 but using the adhesive composition after being allowed to stand at 25° C. for 55 days from its preparation, the operations were carried out.

The peeling strength in case of vulcanization bonding at 170° C. for 15 minutes was 4.5 kg/cm.

EXAMPLE 5

In the same manner as in Example 1 but using the adhesive composition after being allowed to stand at 25° C. for 55 days from its preparation and then diluted with methanol 2 folds, the operations were carried out.

The peeling strength in case of vulcanization bonding at 170° C. for 15 minutes was 5.0 kg/cm.

COMPARATIVE EXAMPLE 4

In the same manner as in Example 5 but using "CHEMLOCK 607" as an adhesive agent, the operations were carried out.

The peeling strength in case of vulcanization bonding at 170° C. for 15 minutes was 1.0 kg/cm.

COMPARATIVE EXAMPLE 5

In the same manner as in Example 5 but using "MONICAS VT-200" as an adhesive agent, the operations were carried out.

The peeling strength in case of vulcanization bonding at 170° C. for 15 minutes was such an extent that as peeled off with the finger force.

EXAMPLE 6

Vinylidene fluoride/tetrafluoroethylene/hexafluoropropene copolymer (100 parts), MT carbon black (30 parts), lead dibasic phosphite (15 parts) and 4,4'-diaminodicyclohexylmethanecarbamate (1.7 parts) were kneaded well and extruded to make a rubber sheet.

The rubber sheet was bonded on a steel plate having a zinc phosphate film at the surface ("BT891"; manufactured by Japan Test Panel Co., Ltd.; 20×60 mm) by the aid of an adhesive agent as shown in Table 1. The adhesive agent was used after being allowed to stand one day from its preparation. The resulting rubber sheet-bonded substrate (thickness of rubber layer, 2.5 mm) was subjected to test for peeling strength. The results are shown in Table 1.

COMPARATIVE EXAMPLES 6 TO 8

In the same manner as in Example 6, the operations were carried out. In case of Comparative Example 6, the adhesive agent was used after being allowed to stand one day from its preparation. The results on the peeling strength test are shown in Table 1.

TABLE 1

|  |  | Example 6 | | Comparative Example | | |
|---|---|---|---|---|---|---|
|  |  | (1) | (2) | 6 | 7 | 8 |
| Adhesive | AFEO | 5 | 5 | 5*3 | "MONICAS VT-200" | "CHEMLOCK 607" |
| agent | Aminosilane | 5*1 | 5*2 | 5*1 |  |  |
| (part) | Methanol | 30 | 30 | 30 |  |  |
|  | Ethanol | 30 | 30 | 30 |  |  |
|  | Acetone | 30 | 30 | 30 |  |  |
| Peeling strength*4 (kg/cm) |  | 6.0 | 7.5 | 4.5 | 5.3 | Peeled off by finger force |

Note:
*1 Aminosilane "A-1100"; manufactured by Nippon Unicar Co., Ltd.; $H_2NCH_2CH_2CH_2Si(OCH_2CH_3)_3$.
*2 Aminosilane "A-1120"; manufactured by Nippon Unicar Co., Ltd.
*3 "EPIKOTE 828"; manufactured by Shell Chemical Co., Ltd.
*4 after vulcanization bonding at 170° C. for 15 minutes.

EXAMPLE 7

The adhesive composition as employed in Example 1 was allowed to stand at room temperature for 150 days. By the use of such adhesive composition, a rubber sheet was adhered on a steel plate having a zinc phosphate film at the surface and subjected to vulcanization bonding under the conditions as shown in Table 4. The peeling strength determined as in Example 1 is shown in Table 4.

EXAMPLE 8

In the same manner as in Example 7 but using an adhesive composition prepared by mixing together the materials as shown in Table 2 and allowed to stand one day, vulcanization bonding was effected. The peeling strength is shown in Table 4.

TABLE 2

| Example 8 | (1) | (2) | (3) |
|---|---|---|---|
| AFEO (part) | 5.0 | 7.0 | 8.0 |
| A-1120 (part) | 5.0 | 3.0 | 2.0 |
| Methanol (part) | 30 | 30 | 30 |
| Ethanol (part) | 30 | 30 | 30 |
| Acetone (part) | 30 | 30 | 30 |

EXAMPLE 9

In the same manner as in Example 7 but using an adhesive composition prepared by mixing together the materials as shown in Table 3 and allowed to stand one day, vulcanization bonding was effected. The peeling strength is shown in Table 4.

TABLE 3

| Example 9 | (1) | (2) | (3) |
|---|---|---|---|
| Rf6EO*1 (part) | 6.0 | 7.0 | 8.0 |
| A-1120 (part) | 4.0 | 3.0 | 2.0 |
| Methanol (part) | 30 | 30 | 30 |
| Ethanol (part) | 30 | 30 | 30 |
| Acetone (part) | 30 | 30 | 30 |

Note:
*1 Rf6EO = $CH_2CHCH_2(CF_2)_6CH_2CHCH_2$ with epoxide oxygens on each end.

COMPARATIVE EXAMPLE 9

In the same manner as in Example 7 but using "MONICAS VT-200" as an adhesive agent, the operations were carried out. The peeling strength is shown in Table 4.

COMPARATIVE EXAMPLE 10

In the same manner as in Example 7 but using "TY-LOCK SB-06" as an adhesive agent, the operations were carried out. The peeling strength is shown in Table 4.

TABLE 4

|  |  | Peeling strength (kg/cm) | |
|---|---|---|---|
|  |  | Primary vulcanization (180° C., 15 min.)*1 | Secondary valcanization (230° C., 24 hrs) |
| Example 7 |  | 1.6 | 4.9 |
| Example 8 | (1) | 5.9 | 4.9 |
|  | (2) | 5.5 | 5.0 |
|  | (3) | 6.6 | 5.2 |
| Example 9 | (1) | 5.5 | 4.9 |
|  | (2) | 5.6 | 5.2 |
|  | (3) | 5.2 | 5.1 |
| Comparative Example 9 |  | 5.5 | 3.6 |
| Comparative Example 10 |  | Peeled off by finger force | Peeled off by finger force |

Note:
*1 thickness of rubber layer, ca. 2.5 mm.

The value as an adhesive agent depends on whether or not it already shows a good adhesive property at the stage of primary vulcanization. From the above results, it is apparent that the adhesive composition of the invention has a remarkable effect in comparison with conventional adhesive agents such as "CHEMLOCK 607," "MONICAS VT-200" and "EPICOAT 828"/aminosilane "A-1100."

There is a clear trend that an adhesive agent is desired to show excellent performance and to be of single liquid. The adhesive composition of the invention does not show any change in its adhesive function even after a lapse of 55 days from its preparation. After being allowed to stand for a period of 150 days, the adhesive composition shows a slight decrease of the bonding force, but the recovery to the original level can be readily achieved by secondary vulcanization.

Conventional two-liquid type adhesive agents have only a short pot life and therefore are required to be consumed completely and immediately after the mixing of the components is once effected. When the adhesive composition of the invention is kept in two-liquid type, no material deterioration in the bonding performance is produced even after stored for a quite long period of time. In addition, even if the mixing is effected, the pot life of the resulting mixture is so long as one month or more. Thus, its handling is much easier than conventional two-liquid type adhesive agents.

What is claimed is:

1. An adhesive composition for fluorinated rubbers which comprises;

a fluorine-containing epoxy compound of the formula:

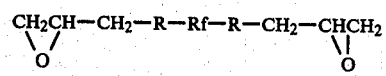

wherein Rf is a fluoroalkylene group having 1 to 18 carbon atoms or a fluorophenylene group, R is a single bond, an alkylene group having 1 or 2 carbon atoms and optionally bearing at least one fluorine atom, an oxyalkylene group having 1 or 2 carbon atoms and optionally bearing at least one fluorine atom or an oxyphenylene group optionally bearing at least one fluorine atom or at least one trifluoromethyl group on the benzene ring; and a silane compound of the formula:

$$R^1SiR_{3-y}^2R_y^3$$

wherein $R^1$ is an alkyl or alkenyl group having 1 to 10 carbon atoms, which is optionally substituted with at least one member of the group consisting of chlorine, amino, aminoalkyl, ureido, epoxyoxy, glycidoxy, epoxycyclohexyl, acryloyloxy, methacryloyloxy, mercapto and vinyl, $R^2$ and $R^3$ are each chlorine, hydroxyl, $C_1$-$C_{10}$ alkoxy, $C_1$-$C_5$ alkoxy ($C_1$-$C_5$) alkoxy, hydroxy ($C_2$-$C_4$) alkoxy or $C_1$-$C_5$ acyloxy and y is an integer of 0, 1 or 2.

2. The adhesive composition according to claim 1, wherein $R^1$ is an aminoalkyl group.

3. The adhesive composition according to claim 1, wherein the weight proportion of the fluorine-containing epoxy compound and the silane compound is from about 95:5 to about 30:70.

* * * * *